United States Patent [19]

Mason et al.

[11] Patent Number: 5,680,998
[45] Date of Patent: Oct. 28, 1997

[54] BRUSH CHIPPING MACHINE WITH IN-LINE DRIVE SYSTEM

[75] Inventors: Mark R. Mason, Raleigh; Harvey T. Satterwhite, Franklinton, both of N.C.

[73] Assignee: Altec Industries, Inc., Birmingham, Ala.

[21] Appl. No.: 690,908

[22] Filed: Aug. 1, 1996

[51] Int. Cl.$^6$ ................................................. B02C 21/02
[52] U.S. Cl. ................................ 241/101.76; 241/285.3
[58] Field of Search ........................... 241/101.76, 285.3, 241/101.71

[56] References Cited

U.S. PATENT DOCUMENTS

| | | | |
|---|---|---|---|
| Re. 32,531 | 10/1987 | Beck et al. | 241/24 |
| 1,631,233 | 6/1927 | Tescher | 241/101.75 X |
| 3,861,602 | 1/1975 | Smith | 241/92 |
| 3,863,848 | 2/1975 | Mashuda | 241/101.75 |
| 3,881,662 | 5/1975 | Gunnarsson | 241/221 |
| 3,944,147 | 3/1976 | Pletcher | 241/60 |
| 3,989,198 | 11/1976 | Blasko | 241/101.7 |
| 4,041,996 | 8/1977 | Grover | 144/2 N |
| 4,062,498 | 12/1977 | Szepaniak | 241/101.7 |
| 4,609,157 | 9/1986 | Thieux | 241/243 |
| 4,632,317 | 12/1986 | Wexell et al. | 241/30 |
| 4,773,600 | 9/1988 | Metski | 241/101.7 |
| 4,827,989 | 5/1989 | Strong | 144/176 |
| 4,889,169 | 12/1989 | Peterson et al. | 241/101.76 X |
| 5,005,620 | 4/1991 | Morey | 241/101.76 X |
| 5,011,091 | 4/1991 | Kopecky | 241/259.1 |
| 5,094,280 | 3/1992 | Kahilahti et al. | 144/176 |
| 5,240,189 | 8/1993 | Majkrazak et al. | 241/55 |
| 5,305,959 | 4/1994 | Chesser | 241/100 |
| 5,323,975 | 6/1994 | Fulghum, Jr. | 241/92 |
| 5,381,970 | 1/1995 | Bold et al. | 241/55 |

*Primary Examiner*—John M. Husar
*Attorney, Agent, or Firm*—Kokjer Kircher Bowman and Johnson

[57] ABSTRACT

A brush chipping machine having an in-line, direct drive connection between the engine drive shaft and the rotor shaft which carries the chipping mechanism. The direct drive system allows the engine and chipping mechanism to be arranged side by side for a more compact configuration of the equipment. Belt drives and the associated maintenance and safety problems are avoided. The feed table and feed chute through which brush is fed to the chipper mechanism can be located close to the curb side of the machine for enhanced convenience and safety.

7 Claims, 2 Drawing Sheets

BRUSH CHIPPING MACHINE WITH IN-LINE DRIVE SYSTEM

FIELD OF THE INVENTION

This invention relates generally to the field of brush chippers and more particularly to a brush chipper having an in-line direct drive arrangement between the engine and chipper head.

BACKGROUND OF THE INVENTION

Tree limbs and other types of brush are more easily handled and disposed of when reduced in volume. Commonly, brush chippers are used to reduce the brush to small chips. Brush chippers that are used for commercial operations are normally mounted on a trailer, which can be situated at the curb by a truck or other towing vehicle. An example of a typical machine is disclosed in U.S. Pat. No. 3,989,198 to Blasko.

A feed table and feed chute direct the brush to a chipping mechanism which takes the form of a rotor carrying chipping blades. The rotor is driven by an engine and cooperates with a cutter bar to cut the brush into small chips which are then delivered to a discharge chute. The discharge chute directs the chips into a truck bed or other collecting device.

In the past, the driving connection between the engine output shaft and the rotor shaft has been effected by sheaves and drive belts. A clutch mechanism is normally provided as well. This type of drive arrangement is not entirely satisfactory for several reasons. First of all, drive belts, sheaves and clutches are notoriously prone to mechanical difficulties and require considerable maintenance, which adds significantly to the cost of operating the equipment. Further, it is well known that belt drive systems are mechanically inefficient because of transmission losses and heat generated between the sheaves and belts. Moving belts also present safety problems because of the risk of objects or human body parts catching in the belts. Finally, a belt drive system is not especially effective in absorbing shocks, so shock loads that are applied to the chipper are transmitted to the engine and can shorten its operating life.

Inherent in a belt drive system is the need to situate the engine either in front of or behind the chipper mechanism. This requires that the trailer frame be long enough to accommodate both units, one generally behind the other, and the need for a lengthy trailer detracts from the compactness of the machine. The chipper is normally at the center of the frame, and the feed table is thus also centered on the frame. Consequently, the feed table is spaced well away from the curb. This is an inconvenience because the operator must move to the feed table in order to deposit the brush, and it also creates additional safety problems by requiring the operator to be closer to passing traffic.

As can easily be appreciated, the chipper blades can wear quickly and become dull, and they must frequently be inspected and/or replaced. Access to the chipper head in conventional machines requires that the long discharge chute be detached and moved out of the way. This is a cumbersome and time consuming operation which increases the down time of the machine and the maintenance costs.

SUMMARY OF THE INVENTION

The present invention is directed to an improved brush chipping machine which is characterized by an in-line direct drive system that eliminates many of the problems associated with conventional belt driven machines. In accordance with a preferred embodiment of the invention, the trailer mounted chipper includes an engine that is mounted directly to the side of the chipper mechanism. The output shaft from the engine is in line with and directly coupled with the rotor shaft which carries the chipping blades. A hydraulic fluid coupling transmits power to the elastomeric coupling which connects the shafts and provides shock absorption and actual alignment that prolongs the life of both the engine and the chipper head.

It is a particular feature of the invention that the rotor and chipping blade are easily accessible. The rotor housing has a cover that is conveniently located and can be easily opened to expose the rotor and chipping blades. This greatly facilitates replacement and adjustment of the blades and the servicing of other components associated with the chipper head.

The in-line drive arrangement is advantageous in that it eliminates the costly maintenance associated with belt drives, it eliminates the transmission losses inherent in belt drive systems, and eliminates some of the hazards of belt drive systems. The in-line drive system also eliminates the need for a clutch and the costs and maintenance problems that are associated with clutch mechanisms. The fluid coupling eliminates human error and abuse of the clutch often associated with starting the unit.

The higher efficiency of a fluid drive over a belt drive is another advantage. Also, the machine has the capability of stopping the rotor without stalling the engine. Finally, the bearing life is extended because of the elimination of overhung (side) loads on the rotor and engine shaft that are inherent in a belt drive system.

The direct drive system also allows the engine and chipper mechanism to be located side by side. This provides a more compact overall configuration and eliminates the lengthy trailers that have been prevalent in the past. In addition, the feed table can be located close to one side of the trailer where it is situated near the curb. This feature enhances both the convenience and the safety of the machine.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
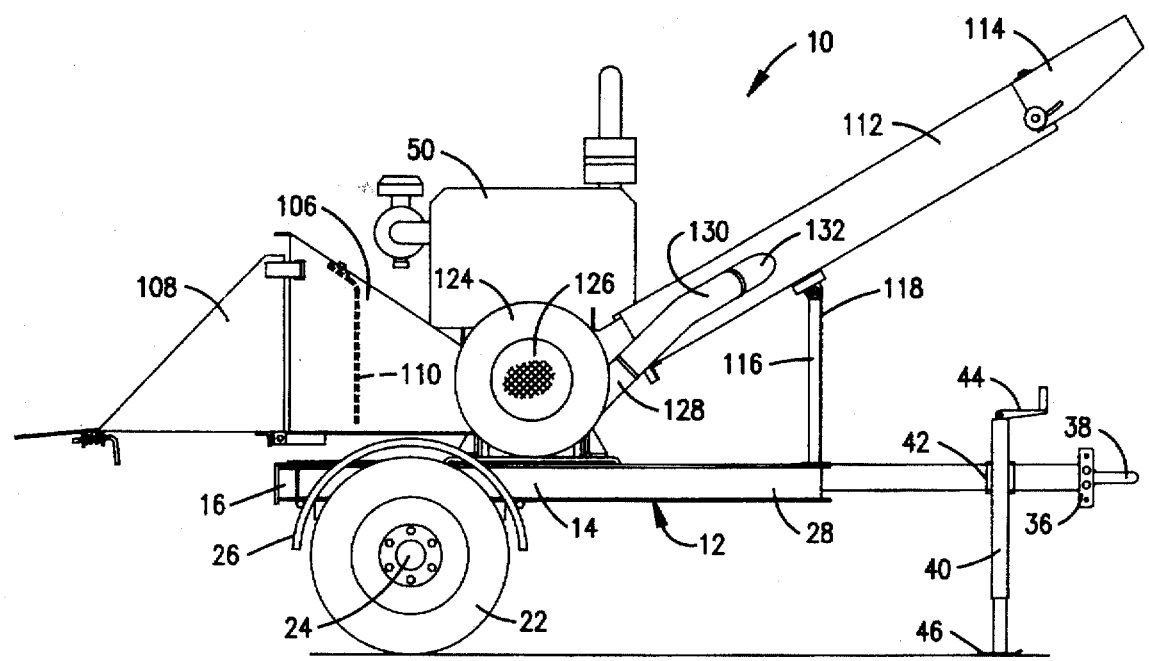
FIG. 1 is a side elevational view of a brush chipping machine constructed according to a preferred embodiment of the present invention.
Figure 2:
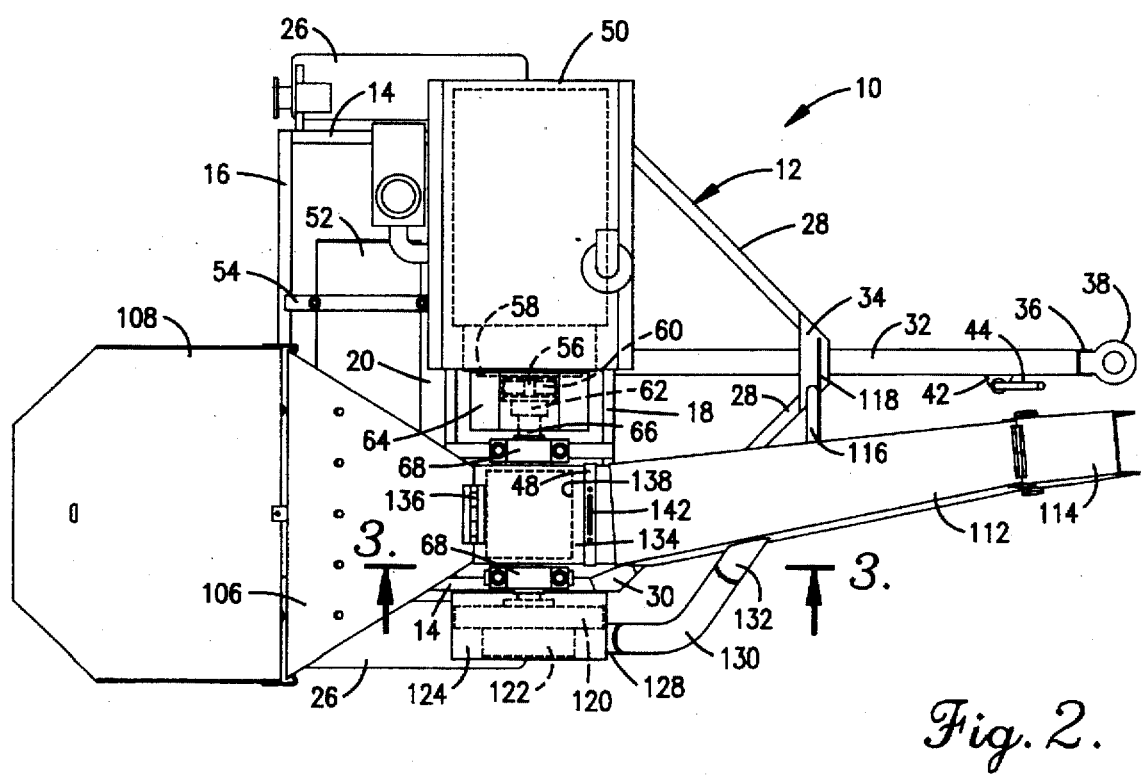
FIG. 2 is a top plan view of the brush chipping machine shown in FIG. 1.

Referring now to the drawings in more detail and initially to FIGS. 1 and 2, numeral 10 generally designates a brush chipping machine constructed in accordance with a preferred embodiment of the present invention. The brush chipping machine 10 is carried on a trailer which is generally identified by numeral 12. The trailer 12 has a rigid frame which includes a pair of side channels 14 connected at their back ends by a rear channel 16. A front channel 18 extends between the forward ends of the side channels 14. The trailer frame further includes an intermediate channel 20 which extends between center portions of the side channels 14. The frame 12 is mounted on a pair of wheels 22 having an axle 24 and each provided with a fender 26.

Extending from the forward ends of the side channels 14 are angled channels 28 which converge as they extend forwardly. The connections between the side channels 14 and the converging channels 28 are reinforced by gusset plates 30 (one of which is visible in FIG. 2). The forward ends of channels 28 are connected with one another and with a draw bar 32. The draw bar extends to connection with the front cross channel 18. A gusset plate 34 strengthens the connection between channels 28 and the draw bar 32. The draw bar 32 may take the form of a square tube. Its forward end carries a hitch bracket 36 and a hitch ring 38 by which the trailer 12 may be towed. A truck or other suitable towing vehicle (not shown) may be used to tow the trailer.

When the trailer 12 is unhitched from its towing vehicle, a jack stand 40 maintains the draw bar 32 in a generally horizontal orientation. The draw bar fits in a swivel bracket 42 connected with one side of the draw bar at location between the gusset plate 34 and the latch ring 38. The swivel bracket 42 allows the jack stand to be swiveled upwardly when not in use. The jack stand has a hand crank 44 at its top end and a base plate 46 at its bottom end. The jack stand can be cranked in opposite directions to change its length and thus move the draw bar upwardly and downwardly in a conventional fashion.

The chipper mechanism which reduces brush to chips is contained within a chipper housing 48 which is mounted on the frame of the trailer 12. As best shown in FIG. 2, the draw bar 32 extends along the longitudinal centerline of the trailer 12, and the housing 48 is centered well to one side of the draw bar 32 (to the right of center as viewed from the rear of the frame). The cutter mechanism is driven by an engine 50 which may be a conventional diesel or gasoline engine. The engine 50 is mounted on the trailer frame 12 at a position directly to one side of the chipper housing 48. A fuel tank 52 which holds fuel for the engine 50 is secured to mounting bars 54 which extend between the channels 16 and 20. The center of the engine 50 is situated on the side of the draw bar 32 opposite the side on which the chipper housing 48 is located. Thus, engine 50 is centered on the left side of the frame as viewed from the rear of the machine.

In accordance with the present invention, the engine 50 drives a horizontal output shaft 56 (see FIG. 2). The engine 50 carries a fly wheel 58 and drives a conventional fluid coupling 60 having an elastomeric coupling 62 on its output side. The fluid coupling 60 is contained within a suitable housing 64 and operates in a conventional way to transmit rotary motion from the engine output shaft 56 to the elastomeric coupling 62.

The elastomeric coupling 62 has a driving connection with a rotor shaft 66 which extends horizontally through the chipper housing 48 and is supported for rotation by a pair of pillow block bearings 68 mounted on the trailer frame 12. One of the bearings 68 is located on each side of the chipper housing 48.

Figure 3:
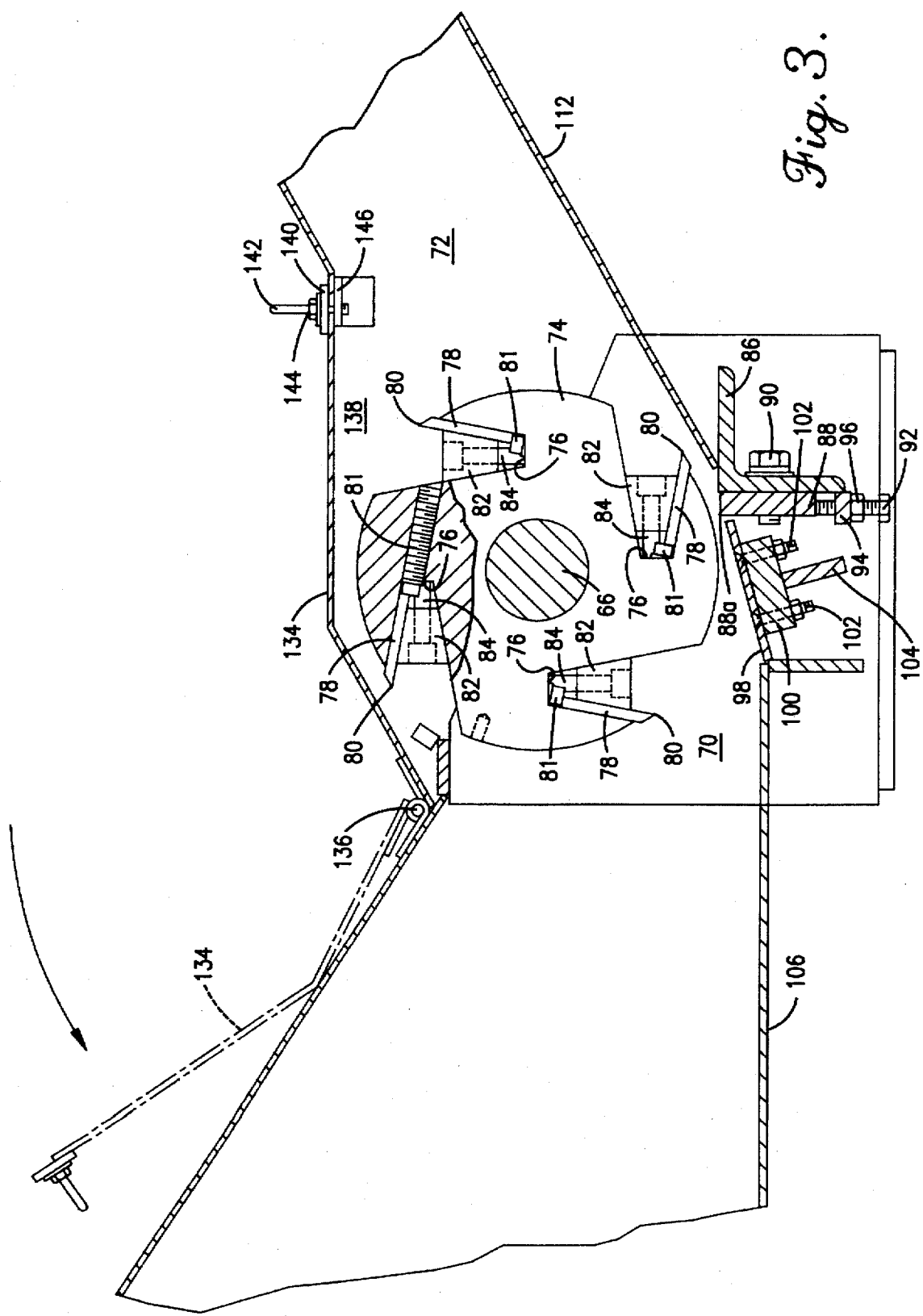
FIG. 3 is a fragmentary sectional view on an enlarged scale taken generally along line 3—3 of FIG. 2 in the direction of the arrows.

FIG. 3 depicts the details of the chipper mechanism contained within the housing 48. The housing has an inlet 70 for receiving incoming brush and an outlet 72 for discharging chips which have been cut from the brush. A rotor 74 is mounted on the rotor shaft 66 at a location within the rotor housing 48. The shaft 66 is driven by the engine 50 in a counterclockwise direction as viewed in FIG. 3, and the rotor 74 rotates with the shaft 66.

The rotor 74 has four equally spaced recesses 76, each of which receives a chipping blade 78 having a sharp cutting edge 80. The blades 78 seat on the ends of adjustment studs 81 which are threaded into passages in the rotor 74. The studs 81 can be adjusted back and forth in their threaded passages to adjust the projection of each blade out of its recess 76. The blades 78 are clamped securely in place within the recesses 76 by wedge blocks 82. The wedge blocks 82 are secured by threaded fasteners 84 which extend through the wedge block and are threaded into the body of the rotor 74. When the wedge blocks 82 are tightly secured in place by the fasteners 84, they clamp the blades 78 in place with the sharp cutting edges 80 projecting beyond the periphery of the rotor by a selected distance controlled by the studs 81.

An angle 86 is secured to the frame of the chipper mechanism. A cutter bar 88 which underlies the rotor 74 is secured to one side of the angle 86 by a fastener 90 which extends through the angle and is threaded through the cutter bar 88. The fastener 90 extends through an oversize opening in the angle 86 to allow the cutter bar 88 to be adjusted up and down for effective cooperation with the chipping blades 78. An adjustment screw 92 is threaded through a fixed bar 94 and bears against the bottom edge of the cutter bar 88 in order to adjust the vertical position of the cutter bar. The shank of the adjustment screw 92 receives a jam nut 96 which may be tightened against the bottom of bar 94 to secure the adjustment screw in place. Bar 88 has a cutting edge 88a which is barely cleared by the blade edges 80 when the rotor is turned. It is noted that the bar 88 actually has four edges which can serve alternately as the cutting edge if the bar is repositioned.

A floor plate 98 extends across the bottom of the chipper housing 48. The floor plate 98 is secured to a block 100 by a plurality of fasteners 102. The block 100 is held on a rigid bar 104 which maintains the floor plate 98 at an inclined angle in order to suitably guide the incoming brush toward the cutting edge 88a of the cutter bar 88.

A feed chute 106 connects with the inlet 70 to the chipper housing in order to deliver incoming brush to the chipping mechanism. A feed table 108 has a hinged connection with the feed chute and assists the operator in feeding brush into the chute. A flexible shroud 110 is located in the feed chute 106 in order to enhance the safety of the machine. It is noted that the location of the chipper housing 48 toward one side of the frame results in the feed chute 106 and feed table 108 also being located close to one side of the machine (the right or curb side).

A discharge chute 112 connects with the outlet 72 of the chipper housing 48 in order to receive the chips resulting from operation of the chipping mechanism. As best shown in FIG. 1, the discharge chute 112 is a lengthy box-like structure and inclines upwardly from bottom to top. On its top end, the discharge chute 112 carries a discharge bonnet 114 which serves to direct the chips into a truck bed or other collecting device. The chute 112 rests on an L-shaped support 116 which extends upwardly from the draw bar gusset 34 and has a horizontal cross portion which underlies the discharge chute. A brace 118 reinforces and strengthens the chute support 116.

As best shown in FIG. 2, the end of the rotor shaft 66 carries a flywheel 120 and a blower wheel 122 which are located within a blower housing 124. The blower housing 124 has a screened inlet 126 (FIG. 1). The blower housing has an outlet 128 to which a hose 130 is connected. The hose 130 connects at its opposite end with a fitting 132 which connects at an angle with the inside of the discharge chute. When the machine operates, the air flow created by the blower wheel through the hose 130 and into the discharge chute 112 assists in conveying the chips through the discharge chute to the bonnet 114.

The chipper housing 48 is provided with a releasable cover 134 which facilitates access to the rotor 74, chipping blade 78 and other components which are located within the chipper housing and which require regular servicing. One edge of the cover 134 is connected by a hinge 136 with the top of the feed chute 106. The top of the chipper housing 48 presents an access opening 138 which is fully exposed when the cover 134 is swung to the open position shown in broken lines in FIG. 3. The access opening 138 is covered when the cover 134 is in the closed position shown in solid lines in FIG. 3. The edge of the cover 134 opposite the hinge 136 carries a flat bar 140. A handle 142 is connected with the bar 140 to facilitate opening and closing of the cover. Extending through the bar 140 are a pair of screws 144 which may be threaded into a flange 146 secured to the discharge chute 112. This secures the cover in the closed position, with the bar 140 overlapping the top lip of the discharge chute 112. The cover 134 can be released simply by unthreading the screws 144 from flange 146, and the cover can then be swung to the open position shown in broken lines in FIG. 3.

In operation, brush is fed onto the feed table 108 and into the feed chute 106 from which it enters the chipper housing inlet 70. The brush is fed along the floor plate 108 to the area of the cutter bar edge 88a, where it is cut into chips by the chipping blades 78 and cutter bar 88 as the rotor 74 turns. The chips are then directed into the discharge chute 112 and are discharged through the bonnet 114 with assistance from the air that is flowing through the hose 130.

In contrast to conventional belt driven machines, the machine of the present invention has an in-line, direct drive arrangement between the engine output shaft 56 and the rotor shaft 66. The elimination of belts, sheaves and clutches is beneficial in that the cost, maintenance and safety problems associated with belt drive systems are avoided. At the same time, the fluid coupling 60 provides shock absorption between the engine 50 and the rotor 74. Consequently, if the rotor is subjected to a shock load, such as when a large hard object is fed into the machine, the hydraulic shock absorption provided by the fluid coupling 60 prevents the engine from being jolted unduly and thus prolongs the engine life. Conversely, the fluid coupling provides absorption of forces in the opposite direction, from the engine to the chipper mechanism.

The in-line, direct drive system with which the machine 10 is equipped is also advantageous in that it allows the machine to present a more compact configuration. In particular, the engine 50 and chipper housing 48 are arranged side by side rather than being arranged one behind the other, and the length of the trailer 12 is reduced accordingly. Another benefit of the in-line drive arrangement is that the chipper housing 48 is located close to the curb side of the machine (the right side as viewed from the rear). Consequently, the feed chute 106 and feed table 108 are located close to the curb where the operator can reach them more conveniently when feeding brush into the machine.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A brush chipper comprising:

a frame adapted to be towed by a towing vehicle and having a transverse axis;

an engine on said frame driving an output shaft oriented substantially parallel to said transverse axis;

a chipper housing on the frame located directly to one side of the engine, said chipper housing having an inlet for receiving brush and an outlet for discharging chips;

a rotor in said housing having chipper blade means for chipping brush into chips upon rotation of the rotor;

a rotor shaft extending in said housing and mounted for rotation in axial alignment with said engine output shaft, said rotor shaft carrying said rotor thereon;

means for coupling said engine output shaft with said rotor shaft in a direct drive, in-line arrangement to rotate said rotor when the output shaft is rotated; and a discharge chute extending from said outlet of the housing to receive chips therefrom.

2. A brush chipper as set forth in claim 1, wherein said coupling means comprises a fluid coupling providing shock absorption between the engine and rotor.

3. A brush chipper as set forth in claim 1, including:

an access opening in the top of said chipper housing providing access to said rotor and chipper blade means when exposed;

a cover for said access opening having a closed position closing the opening and an open position exposing the opening; and releasable means for retaining said cover in the closed position.

4. A brush chipper as set forth in claim 1, wherein:

said frame has a longitudinal center line;

said engine is centered at a location on one side of said center line; and said chipper housing is centered at a location on the side of said center line opposite said one side.

5. A brush chipping machine comprising:

a rigid frame adapted to be towed by a towing vehicle and having a transverse axis;

an engine mounted on the frame and operable to drive an output shaft oriented substantially parallel to said transverse axis;

a chipper housing having an inlet and an outlet, said housing being mounted on the frame directly to one side of and spaced from the engine;

a rotor shaft mounted to rotate in said housing and axially aligned with said output shaft;

fluid coupling means located between said engine and housing for effecting a direct, in-line coupling between said output shaft and rotor shaft for driving of the rotor shaft when the output shaft is driven by the engine;

a rotor carried in said housing on said rotor shaft and having chipper blade means for chipping brush when the rotor is rotated; and a discharge chute extending from the outlet of said housing to receive the chips.

6. Brush chipping apparatus comprising:

a trailer having wheels and a rigid frame adapted to be towed, said frame having a longitudinal center line;

an engine mounted on said frame at a location centered on one side of said center line, said engine driving an output shaft oriented substantially perpendicular to said longitudinal center line;

a chipper housing mounted on the frame at a location directly to one side of said engine and centered on the side of the center line opposite said one side, said housing having an inlet for receiving brush and an outlet for discharging chips;

a rotor shaft mounted to rotate in said housing and axially aligned with said output shaft;

coupling means located between said engine and chipper housing for drivingly coupling said output shaft to said rotor shaft with the shafts in axial alignment;

a rotor in said housing carried on said rotor shaft for rotation therewith, said rotor having chipper blade means for chipping brush into chips; and a discharge chute extending from said outlet of the housing to receive chips therefrom.

7. Brush chipping apparatus as set forth in claim 6, wherein:

said frame has a front and a rear;

said engine is centered on the left side of said center line when viewed from the rear of the frame; and said chipper housing is centered on the right side of said center line when viewed from the rear of the frame.

* * * * *